United States Patent
Lattari et al.

[11] 3,935,986
[45] Feb. 3, 1976

[54] SOLID STATE BONDING PROCESS EMPLOYING THE ISOTHERMAL SOLIDIFICATION OF A LIQUID INTERFACE

[75] Inventors: Pasquale R. Lattari, Attleboro; Carl Redfield, North Attleboro, both of Mass.

[73] Assignee: Texas Instruments Incorporated, Dallas, Tex.

[22] Filed: Mar. 3, 1975

[21] Appl. No.: 554,383

[52] U.S. Cl. ............. 228/115; 228/175; 228/194; 228/190; 228/263
[51] Int. Cl.² ......................................... B23K 28/02
[58] Field of Search ........... 228/115, 117, 190, 193, 228/194, 195, 175, 231, 263

[56] References Cited
UNITED STATES PATENTS

| | | | |
|---|---|---|---|
| 2,845,698 | 8/1958 | Giovannucci et al. | 228/263 |
| 3,397,445 | 8/1968 | Ulmer et al. | 228/263 |
| 3,496,630 | 2/1970 | Duff et al. | 228/263 |
| 3,668,758 | 6/1972 | Krock et al. | 228/193 X |
| 3,678,570 | 7/1972 | Paulonis et al. | 228/194 |

Primary Examiner—Harold D. Whitehead
Assistant Examiner—K. J. Ramsey
Attorney, Agent, or Firm—John A. Haug; James P. McAndrews; Russell E. Baumann

[57] ABSTRACT

A solid state bonding process of malleable metals employing the isothermal solidification of a liquid interface to overcome bonding problems inherent in certain material combinations especially when subjected to high annealing temperatures. The technique employs the use of a solid metal interliner clad between the two components to be bonded which has a lower melting point than the adjacent components, is diffusible into either one or both of the adjacent components and maintains ductility after alloying with the adjacent components. The composite material is then heat treated above the melting point of the interliner causing momentary liquifying of the interliner, diffusing the liquid metal into either one or both of the adjacent components thereby forming a progressively higher melting point alloy and subsequent isothermal solidification of the high melting alloy to securely bond the two components together.

6 Claims, 3 Drawing Figures

SOLID STATE BONDING PROCESS EMPLOYING THE ISOTHERMAL SOLIDIFICATION OF A LIQUID INTERFACE

BACKGROUND OF THE INVENTION

This invention relates to a solid state bonding process of malleable metals and more particularly to a solid state bonding process of malleable metals employing the isothermal solidification of a liquid interface to provide a reliable bond with certain material combinations where unattainable in the past. The term metals as used herein includes alloys.

Some metal material combinations do not normally form a suitably stable solid state bond utilizing standard cold bonding techniques, especially when subsequent high temperature heat treating is required. The cladding of silver to copper or of some silver alloys to some copper alloys are examples of such combinations. The bond developed between these sets of materials may be successful but any attempt to heat them above 800°F after bonding most always results in severe bond blistering and delamination.

In many applications a desirable material combination is one which necessitates a post bonding anneal over 800°F in order to possess certain properties. For example, a three layer composite of a silver or silver alloy bonded to a copper or copper alloy bonded to a high work hardening, high melting point backing material is especially useful as an electrical contact material. However, in order to achieve the necessary formability characteristics in the high work hardening layer of this aforementioned composite, a high temperature heat treatment is required. This heat treatment requirement prevents the use of the standard solid state cold bonding technique and thereby necessitates the use of a more costly alternate bonding method.

It is an object of the present invention to provide a method of solid state bonding of malleable metals which employs the isothermal solidification of a liquid interface. Another object of this invention is to provide a method of cold solid state bonding which creates a composite material of a silver or silver alloy, a copper or copper alloy, and a work hardening backing material which can be heat treated without deleterious effects to the bond integrity. Other objects and features will be in part apparent and in part pointed out hereinafter.

Briefly, the present invention comprises a solid state bonding process of malleable metals employing the isothermal solidification of a liquid interface to overcome bonding problems inherent in certain material combinations when subjected to post-bonding high annealing temperatures. The process employs the use of a solid metal interliner clad between the two components to be bonded which has a lower melting point than the adjacent components, is diffusible into either one or both of the adjacent components, and maintains ductility after alloying with the adjacent components. The composite is then further processed and heat treated at such a temperature to be above the melting temperature of the interliner. During this heat treating anneal, the interliner momentarily liquifies and then isothermally solidifies due to the diffusion of the liquid into either one or both of the adjacent components thereby forming a progressively higher melting point alloy. This new alloy at the bond interface supplies a strong intermediate layer between the two components which is strong and ductile.

In the accompanying drawings, in which one of various possible embodiments of the invention is illustrated:

Corresponding reference characters indicate corresponding parts throughout the several views of the drawings. The drawings are illustrative and not to scale.

Figure 1:
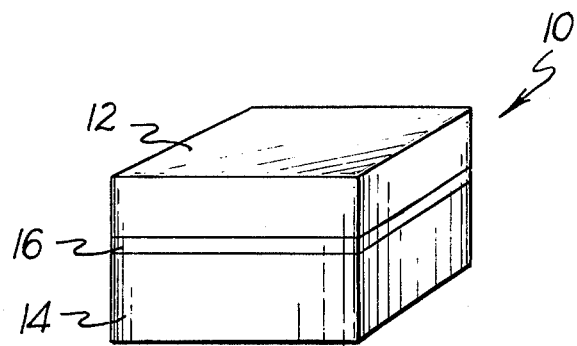
FIG. 1 is a cross-section view showing a two layer composite with an interliner which are bonded together to form strip material according to the invention before a subsequent anneal.

Referring to the drawings, FIG. 1 depicts a typical two layer composite material 10 made in accordance with this invention. Composite material 10 has a first layer 12, a second layer 14 and an interliner 16 sandwiched between the first and second layers. First layer 12 and second layer 14 come from a group of metallic materials that do not readily form a stable solid state bond together such as silver and copper, especially when subjected to a post bonding high temperature anneal.

Interliner 16 is a very thin metal layer bonded between layer 12 and layer 14 which has three distinct properties. First, the melting point of the interliner is lower than the melting point of either of the two layers adjacent to it. In fact the melting point should be below that of the post bonding annealing temperature. Second, the interliner is diffusible into either one or both of the adjacent components. Third, the new alloy or alloys formed after diffusion with the adjacent component or components is ductile.

The three layers 12, 14, and 16 are cold solid state bonded together by conventional means yielding a composite material as shown in FIG. 1. It may be noted that all three layers are distinctly separate at this stage of the process. After further processing the material receives a post-bonding anneal in order to achieve a desired property such as hardness, grain size, formability, etc. Whatever the reason for the anneal, the temperature of the anneal is chosen to achieve the desired characteristic and also to be compatible with the interliner choice so as to be above the melting point of the interliner to produce an acceptable bond by the isothermal solidifying of the liquid interliner.

During the post bonding annealing process, interliner 16 reaches its melting point and consequently liquifies. The diffusion of this liquid at the interface into either one or both of its adjacent components forms a progressively higher melting point alloy which in turn causes the liquid interface to quickly isothermally solidify. The alloy or alloys caused by the diffusion serves as a ductile boundary area which holds the two components together. This diffusion process also produces an interface between the two components which possesses virtually the same properties as the adjacent components which is very important in certain applications. For example, the two components might be chosen for their electrical and thermal properties together as a composite and it would be harmful if the interliner significantly altered these properties of the composite.

Figure 2:
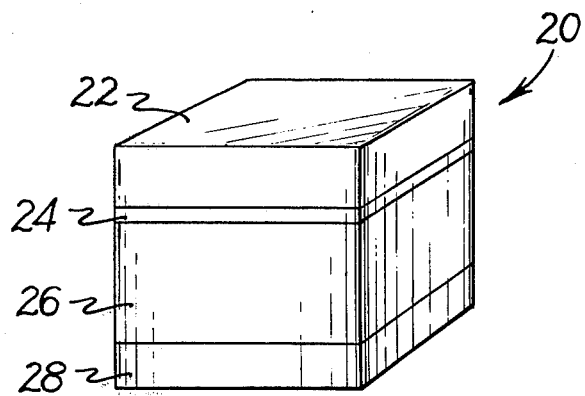
FIG. 2 is a cross-section view of a preferred three layer composite with the interliner in accordance with this invention before a subsequent anneal.
Figure 3:
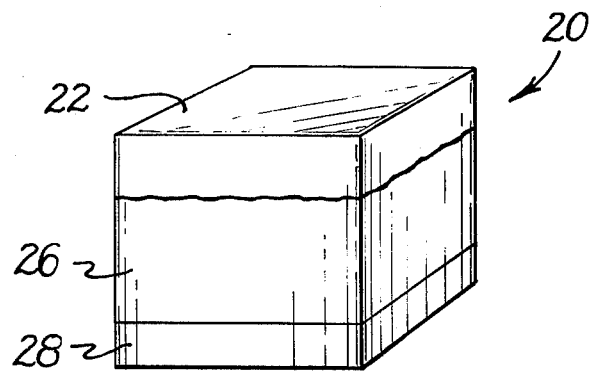
FIG. 3 is a cross-section view of the preferred three layer composite of FIG. 2 after the subsequent anneal.

There are numerous combinations where this solid state bonding technique overcomes bond reliability problems; however, it is appropriate at this point, for purposes of immediate illustration, to specify one frequently used material combination especially for electrical contact parts. A composite 20 as shown in FIGS. 2 and 3 comprises a silver layer 22, an interliner 24, a copper layer 26, a backing material 28. The relative thickness of the various components vary from application to application but typically copper layer 26 is the thickest and interliner 22 is by far the thinnest averaging less than .001 of an inch prior to the post bonding anneal. All four components are cleaned and then cold solid state bonded in a conventional manner yielding a composite as shown in FIG. 2.

The exact choice of backing material 26 is governed by such factors as cost, weldability, strength, thermal and electrical conductivity, and thermal expansion. Typical choices are LC steel, nickel, monel, and ferritic stainless steel.

The choice of interliner 24 also varies depending on the post bonding annealing temperature. A particularly useful interliner is an alloy with 52 percent silver by weight, 16 percent copper by weight, 15.5 percent zinc by weight, and 16.5 percent cadmium by weight. The alloy has a melting point of 1160°F and is therefore useful where the post bonding annealing temperature is from 1200° to 1350°F, which is a satisfactory annealing range for the backing material choices mentioned above.

After the solid state bonding operation and subsequent processing, composite 20 is annealed at 1200° to 1350°F wherein interliner 24 momentarily liquifies and isothermally solidifies by diffusing into both silver layer 22 and copper layer 26 creating higher melting temperature alloys with both. As shown by FIG. 3 interliner 24 is no longer a distinct layer between the silver and copper due to its diffusion into them. Interliner 24 is alloyed with the copper and silver producing ductile alloys at the bond interface of the silver layer and copper layer which will hold them together.

The annealing temperature of 1200° to 1350° will also be above the recrystallization temperature of the backing materials which will allow the desired formability for parts manufacture.

The above illustration describes only one small group of composites wherein the bonding technique of this invention overcomes prior solid state bonding problems. The process works equally well for overcoming bonding problems in joining high silver bearing alloys to high copper bearing alloys and silver to palladium. The choice of interliner is also only illustrative with many possible alternates possible so long as the interliner meets the three requirements. Below in Table I is a partial list of possible interliners for use with silver and copper alloys. It is good to note that the interliner most often is primarily made up of the two adjacent materials to the interliner to be bonded.

Factual matters herein stated, both with regard to the steps employed and the results obtained, are definite and realizable, regardless of theory. The theoretical explanations of the various results appear to be most reasonable, but we do not intend to be bound thereby because other theoretical explanations may be conceived.

In view of the above, it will be seen that the several objects of the invention are achieved and other advantageous results attained.

Since many changes could be made in the above process without departing from the scope of the invention, it is intended that all matter contained in the above description or shown in the accompanying drawings shall be interpreted as illustrative and not in a limiting sense.

We claim:

1. An improved system for bonding selected metals comprising:
    arranging an interliner metal layer between a first and a second layer, said interliner layer having a lower initial melting temperature than either the first or second layers and being heat diffusible with at least one of said layers to form a ductile alloy having a relatively higher melting temperature.
    solid state pressure bonding said interliner and said layers to form a composite material, and
    post bond heating of said metal layers at a temperature above said initial melting temperature of said interliner layer and below said relatively higher melting temperature of said alloy for sufficient time to melt said interliner and initiate diffusion of said intermediate layer meterial with at least said one of the two layers to form a layer of said new alloy of higher melting point and to solidify said new alloy layer for securely bonding said first and second layers of metal together.

2. An improved system for bonding as set forth in claim 1 wherein said first layer is silver or a high silver alloy and said second layer is copper or a high copper alloy.

3. An improved system for bonding as set forth in claim 2 wherein the composition by weight of said interliner is 52 percent silver, 16 percent copper, 15.5 percent zinc, and 16.5 percent cadmium.

4. An improved system for bonding as set forth in claim 2 wherein the composition by weight of said interliner is 72 percent silver and 28 percent copper.

5. An improved system for bonding a first layer of silver or silver alloy component to a second layer of copper or copper component to a third layer of a high work hardening component comprising:
    arranging an interliner metal layer between the first and the second layer, said interliner layer having a lower initial melting temperature than any of the layers and being heat diffusible with at least one of said adjacent layers to form a ductile alloy having a relatively higher melting temperature,
    solid state pressure bonding said interliner and said layers to form a composite material, and
    post bond heating of said metal layers at a temperature above the recrystallization temperature of said Table I

|  | Cu Wt % | Silver Wt % | Zn Wt % | CO Wt % | Melting Point °F |
|---|---|---|---|---|---|
| Interliner No. 1 | 16 | 52 | 15.5 | 16.5 | 1160 |
| Interliner No. 2 | 28 | 72 | 0 | 0 | 1436 |
| Interliner No. 3 | 50 | 15.5 | 16.5 | 18 | 1175 |
| Interliner No. 4 | 30 | 70 | 0 | 0 | 1454 |
| Interliner No. 5 | 32 | 52 | 13 | 3 | 1330 | high work hardening layer and initial melting temperature of said interliner layer and below said relatively higher melting temperature of said alloy for sufficient time to recrystallize said work hardening layer and to melt said interliner and initiate diffusion of said interliner layer material with at least one of the two adjacent layers to form a layer of said new alloy of higher melting point and to solidify said new alloy layer for securely bonding said layers of metal together.

6. An improved system for bonding as set forth in claim 5 wherein the third layer of a high work hardening component is selected from a group consisting of low carbon steel, nickel, monel, and ferritic stainless steel.

* * * * *